United States Patent
Komatsu et al.

(10) Patent No.: US 10,414,896 B2
(45) Date of Patent: Sep. 17, 2019

(54) COMPOSITE RESIN MATERIAL, SLURRY, SHAPED COMPOSITE RESIN MATERIAL PRODUCT, AND SLURRY PRODUCTION PROCESS

(71) Applicant: ZEON CORPORATION, Chiyoda-ku, Tokyo (JP)

(72) Inventors: Masaaki Komatsu, Tokyo (JP); Arinobu Katada, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/745,787

(22) PCT Filed: Jul. 29, 2016

(86) PCT No.: PCT/JP2016/003523
§ 371 (c)(1),
(2) Date: Jan. 18, 2018

(87) PCT Pub. No.: WO2017/022229
PCT Pub. Date: Feb. 9, 2017

(65) Prior Publication Data
US 2018/0208738 A1      Jul. 26, 2018

(30) Foreign Application Priority Data

Jul. 31, 2015    (JP) ................................. 2015-152606

(51) Int. Cl.
*C08K 3/04* (2006.01)
*C08K 7/06* (2006.01)
(Continued)

(52) U.S. Cl.
CPC .............. *C08K 3/041* (2017.05); *C08J 3/212* (2013.01); *C08J 3/215* (2013.01); *C08K 7/06* (2013.01);
(Continued)

(58) Field of Classification Search
CPC ............ H01B 1/12; C08K 3/041; C08L 27/18
(Continued)

(56) References Cited

U.S. PATENT DOCUMENTS

| 2008/0318049 A1 | 12/2008 | Hata et al. |
| 2012/0241692 A1 | 9/2012 | Yajima et al. |
| 2013/0310522 A1 | 11/2013 | Yajima et al. |

FOREIGN PATENT DOCUMENTS

| JP | 2012210796 A | 11/2012 |
| JP | 5603059 B2 | 10/2014 |

(Continued)

OTHER PUBLICATIONS

Nov. 1, 2016, International Search Report issued in the International Patent Application No. PCT/JP2016/003523.
(Continued)

*Primary Examiner* — Khanh T Nguyen
(74) *Attorney, Agent, or Firm* — Kenja IP Law PC (57) ABSTRACT

Disclosed is a composite resin material which includes a fluororesin and fibrous carbon nanostructures, wherein the composite resin material has a fluororesin content of 70% by mass or more and a fibrous carbon nanostructure content of 0.01% to 0.5% by mass based on the amount of the fluororesin, and wherein when a 50 μm thick shaped product obtained by shaping the composite resin material is observed with an optical microscope, the number of aggregates that contain the fibrous carbon nanostructures as a main component and have a diameter of 300 μm or more is 3 or less in a 30 mm×30 mm field of view.

15 Claims, 1 Drawing Sheet

(51) Int. Cl.
*C08J 3/215* (2006.01)
*C08J 3/21* (2006.01)
*C08L 27/12* (2006.01)
*B82Y 30/00* (2011.01)
*B82Y 40/00* (2011.01)
*H01B 1/24* (2006.01)
*C08L 27/18* (2006.01)

(52) U.S. Cl.
CPC ............... *B82Y 30/00* (2013.01); *B82Y 40/00* (2013.01); *C08J 2327/18* (2013.01); *C08K 2201/001* (2013.01); *C08K 2201/003* (2013.01); *C08K 2201/004* (2013.01); *C08K 2201/011* (2013.01); *C08L 27/12* (2013.01); *C08L 27/18* (2013.01); *H01B 1/24* (2013.01); *Y10S 977/75* (2013.01); *Y10S 977/752* (2013.01); *Y10S 977/753* (2013.01); *Y10S 977/842* (2013.01)

(58) Field of Classification Search
USPC ........................................ 525/326.2; 252/511
See application file for complete search history.

(56) References Cited

FOREIGN PATENT DOCUMENTS

| | | |
|---|---|---|
| JP | 2015030821 A | 2/2015 |
| WO | 2006011655 A1 | 2/2006 |
| WO | 2011070813 A1 | 6/2011 |
| WO | 2012107991 A1 | 8/2012 |

OTHER PUBLICATIONS

Feb. 6, 2018, International Preliminary Report on Patentability issued in the International Patent Application No. PCT/JP2016/003523.

COMPOSITE RESIN MATERIAL, SLURRY, SHAPED COMPOSITE RESIN MATERIAL PRODUCT, AND SLURRY PRODUCTION PROCESS

TECHNICAL FIELD

The present disclosure relates to a composite resin material, a slurry, a shaped composite resin material product, and a process for producing a slurry, and more particularly to a composite resin material, a slurry, a shaped composite resin material product, which contain a fluororesin and fibrous carbon nanostructures, and a slurry production process.

BACKGROUND

For their excellent electrical conductivity, thermal conductivity, sliding characteristics, mechanical characteristics and other characteristics, studies have been made on fibrous carbon nanostructures such as carbon nanotubes (hereinafter occasionally referred to as "CNTs") for use in a wide variety of applications.

These studies have led to recent efforts to develop a technology that provides composite resin materials having resin characteristics (e.g., workability and strength) combined with characteristics of fibrous carbon nanostructures (e.g., electrical conductivity) by exploiting such excellent characteristics of fibrous carbon nanostructures to form a composite of the fibrous carbon nanostructures and resin material.

Specifically, there have been proposed composite resin materials in which fibrous carbon nanostructures are dispersed and retained on the surface of a particulate resin material (hereinafter occasionally referred to as "resin particles") (see, e.g., PTL 1 and PTL 2). The composite resin material described in PTL 1 is produced by a process including the step of mixing fibrous carbon nanostructures using ultrasonic waves for attachment on the surface of resin particles which have been swollen and softened in subcritical or supercritical carbon dioxide. With this production process, the fibrous carbon nanostructures are dispersed to cover almost the entire surface of the resin particles by the action of ultrasonic waves and are also firmly embedded within the resin particles from the surface toward the inside.

The composite resin material described in PTL 2 is produced by a process including the step of adsorbing fibrous carbon nanostructures on the surface of swollen, softened resin particles by gently stirring a mixed solution of the fibrous carbon nanostructures and resin particles in a subcritical or supercritical carbon dioxide atmosphere. With this production process, it is possible to produce composite resin particles without causing fragmentation of the fibrous carbon nanostructures.

CITATION LIST

Patent Literature

PTL 1: JP5603059B
PTL 2: WO2012/107991A

SUMMARY

Technical Problem

Fibrous carbon nanostructures are required to be well dispersed in composite resin materials used to form members that require cleanliness and electrical conductivity, such as integrated circuit trays, wafer carriers, chemical solution hoses, and sealing materials.

In the production processes described in PTL 1 and PTL 2, however, fibrous carbon nanostructures are placed on the surface of particulate resin material, so that the resin material needs to be kept in particulate form when forming a composite of the resin material and fibrous carbon nanostructures. This requires the production processes described in PTL 1 and PTL 2 to employ a relatively moderate mixing condition to form such a composite. Thus, there remains room in the art for improvement in the dispersiveness of the fibrous carbon nanostructures in the obtained composite resin material.

An object of the present disclosure is therefore to provide a composite resin material, a slurry, a shaped composite resin material product, and a slurry production process, which provide highly dispersed fibrous carbon nanostructures.

Solution to Problem

The inventor made extensive studies in order to achieve the foregoing object. The inventor discovered that the dispersiveness of fibrous carbon nanostructures in a composite resin material can be improved by employing a fluororesin as a resin material and forming a composite of the resin material and fibrous carbon nanostructures under a predetermined condition, and completed the present disclosure.

Specifically, the present disclosure is aimed at advantageously solving the foregoing problem, and the disclosed composite resin material comprises a fluororesin and fibrous carbon nanostructures, wherein the composite resin material has a fluororesin content of 70% by mass or more and a fibrous carbon nanostructure content of 0.01% to 0.5% by mass based on the amount (100% by mass) of the fluororesin, and wherein when a 50 μm thick shaped product obtained by shaping the composite resin material is observed with an optical microscope, the number of aggregates that contain the fibrous carbon nanostructures as a main component and have a diameter of 300 μm or more is 3 or less in a 30 mm×30 mm field of view. In such a composite resin material in which a fluororesin as a resin material is blended with fibrous carbon nanostructures at a specific ratio so as to meet a predetermined condition, the fibrous carbon nanostructures are highly dispersed.

The "fluororesin content" of the composite resin material herein can be measured using a thermogravimetric analyzer wherein the composite resin material is thermally decomposed under nitrogen. The "fibrous carbon nanostructure content based on the amount (100% by mass) of the fluororesin" herein can be obtained using a thermogravimetric analyzer wherein the composite resin material is thermally decomposed under nitrogen and further thermally decomposed in air.

By "contain the fibrous carbon nanostructures as a main component" as used herein it is meant fibrous carbon nanostructures account for 70% by mass or more of the components constituting the aggregate.

The "50 μm thick shaped product" can be obtained by cutting out a 50 μm thick sheet from a shaped product which is obtained for example by compression molding of the disclosed composite resin material.

In the disclosed composite resin material, it is preferred that the fibrous carbon nanostructures include carbon nanotubes and the fibrous carbon nanostructures that include carbon nanotubes have a number-average diameter of 1 nm to 60 nm and a number-average length of 10 μm or more. By blending fibrous carbon nanostructures including carbon nanotubes and having such a size, it is possible to stably impart electrical conductivity to the composite resin material with small added amounts of the fibrous carbon nanostructures as well as to increase the dispersiveness of the fibrous carbon nano structures.

The number-average diameter of carbon nanotubes can be obtained for example by measuring the diameters of 20 carbon nanotubes on a transmission electron microscope (TEM) image and averaging the measured diameters by number. The number-average length of carbon nanotubes can be obtained for example by measuring the lengths of 20 carbon nanotubes on a scanning electron microscope (SEM) image and averaging the measured lengths by number.

The present disclosure is aimed at advantageously solving the foregoing problem and the disclosed slurry comprises a fluororesin, fibrous carbon nanostructures and a dispersion solvent, wherein the slurry has a fluororesin content of 70% by mass or more based on total solid content in the slurry and a fibrous carbon nanostructure content of 0.01% to 0.5% by mass based on the amount (100% by mass) of the fluororesin, and wherein the fluororesin has a fibrous network structure. In such a slurry in which a predetermined amount of fluororesin having a fibrous network structure is included as a resin material and fibrous carbon nanostructures are blended at a specific ratio, the fibrous carbon nanostructures are well dispersed.

In the disclosed slurry, it is preferred that the fluororesin having a fibrous network structure has a structure in which fibrous parts extend radially from the particulate part. When the fluororesin has such a structure in which fibrous parts extend radially from the particulate part, the fibrous carbon nanostructures are more highly dispersed.

It is preferred that the disclosed slurry has a solid sedimentation degree of 0.50 or more which is defined as a ratio of solid layer height to overall height of a dispersion liquid of the slurry adjusted to have a solid concentration of 15% by mass, as measured at a time point 1 hour after pouring the dispersion liquid into a predetermined container. In such a slurry having a solid sedimentation degree of 0.50 or more, fibrous carbon nanostructures are more highly dispersed.

The present disclosure is aimed at advantageously solving the foregoing problem and the disclosed shaped composite resin material product is obtainable by shaping a composite resin material obtainable from the slurry described above. In this shaped composite resin material product, fibrous carbon nanostructures are highly dispersed.

The present disclosure is aimed at advantageously solving the foregoing problem and the disclosed slurry production process is for producing the slurry described above, wherein the process comprises fibrillating a particulate fluororesin using at least one device selected from the group consisting of a wet jet mill, an ultrasonic wave generator and a thin-film spin system disperser to provide a fluororesin having a fibrous network structure. With this slurry production process, the dispersiveness of fibrous carbon nanostructures in the slurry can be increased.

By "particulate" as used herein for fluororesin it is meant that the aspect ratio (major axis/minor axis) of a fluororesin particle is 1 to less than 3.

It is preferred that the disclosed slurry production process comprises mixing a particulate fluororesin, fibrous carbon nanostructures, and a dispersion medium to prepare a mixture, and fibrillating the particulate fluororesin while dispersing the mixture using a wet jet mill. With this slurry production process, fibrillation of the fluororesin and dispersing of the fibrous carbon nanostructures are performed at the same time, so that the dispersiveness of fibrous carbon nanostructures in the slurry can be further increased.

In the disclosed slurry production process, it is preferred that the dispersion medium is a nonpolar solvent. By using a nonpolar solvent as the dispersion medium, it is possible to reduce clogging that may occur in the nozzle or check valve of a wet jet mill.

It is further preferred that the disclosed slurry production process is substantially surfactant-free. When a slurry to be produced is substantially surfactant-free by making the slurry production process substantially surfactant-free, it is possible to limit outgassing from the composite resin material produced using the slurry. Of note, with the disclosed slurry production process that involves the use of a wet jet mill for fibrillation of the fluororesin, it is possible to allow the fibrous carbon nanostructures to be well dispersed without using a surfactant.

By "substantially surfactant-free" as used herein for the slurry production process it is meant that no surfactant is added except for those that are unavoidably incorporated for example as impurities.

By "substantially surfactant-free" as used herein for the slurry it is meant that the surfactant content in the slurry based on total solid content is less than 0.01% by mass, preferably zero.

It is also preferred that the disclosed slurry production process comprises: dispersing a fibrous carbon nanostructure mixture containing fibrous carbon nanostructures, a surfactant and a dispersion medium with a wet jet mill, an ultrasonic wave generator or a homogenizer to prepare a fibrous carbon nanostructure dispersion liquid; dispersing a fluororesin mixture containing a particulate fluororesin and a dispersion medium with an ultrasonic wave generator or a thin-film spin system disperser to prepare a fluororesin dispersion liquid; and mixing together the fluororesin dispersion liquid and the fibrous carbon nanostructure dispersion liquid to prepare a mixture containing the fibrous carbon nanostructures and the fluororesin, and then dispersing the mixture with a thin-film spin system disperser or a homogenizer to prepare a mixed dispersion liquid of the fibrous carbon nanostructures and fluororesin having a fibrous network structure. With this slurry production process, it is possible to increase the dispersiveness of the fibrous carbon nanostructures in the slurry and to easily produce a slurry by dispersing the fluororesin with an ultrasonic wave generator or a thin-film spin system disperser which is free from the risk of clogging.

By "homogenizer" as used herein it is particularly meant a stirring device that utilizes a strong stirring effect of high-speed rotating blades.

Advantageous Effect

According to the present disclosure, it is possible to provide a composite resin material, a slurry, and a shaped composite resin material product, which have highly dispersed fibrous carbon nanostructures.

DETAILED DESCRIPTION

Hereinafter, embodiments of the present disclosure will be described in detail.

The disclosed composite resin material, slurry, and shaped composite resin material product each comprise a fluororesin and fibrous carbon nanostructures wherein the fibrous carbon nanostructures are highly dispersed. The disclosed slurry production process is used for producing the disclosed slurry.

(Composite Resin Material)

The disclosed composite resin material can be used for any purpose, e.g., for the formation of members that require cleanliness and electrical conductivity, such as integrated circuit trays, wafer carriers, chemical solution hoses, and sealing materials. The disclosed composite resin material comprises a fluororesin and fibrous carbon nanostructures and has a fluororesin content of 70% by mass or more and a fibrous carbon nanostructure content of 0.01% to 0.5% by mass based on the amount (100% by mass) of the fluororesin. One major feature of the disclosed composite resin material is that when a 50 μm thick shaped product obtained by shaping the composite resin material under a predetermined condition is observed with an optical microscope, the number of aggregates that contain the fibrous carbon nanostructures as a main component and have a diameter of 300 μm or more is 3 or less in a 30 mm×30 mm field of view. The disclosed composite resin material can be made using the disclosed slurry later described.

<Fluororesin>

Fluororesin refers to a polymer which comprises a fluorine-containing monomer unit. By "containing monomer unit" as used herein it is meant that "a repeating unit derived from a monomer is included in a polymer obtained using that monomer." Examples of fluororesins included in the disclosed composite resin material include crystalline fluororesins such as polytetrafluoroethylene (PTFE), tetrafluoroethylene perfluoroalkyl vinyl ether copolymer (PFA), tetrafluoroethylene hexafluoropyruvylene copolymer (FEP), tetrafluoroethylene ethylene copolymer (ETFE), polychlorotrifluoroethylene (PCTFE), chlorotrifluoroethylene ethylene copolymer (ECTFE), polyvinylidene fluoride (PVDF), and polyvinyl fluoride (PVF). Preferably, the fluororesin is PTFE or PFA, with PTFE being particularly preferred because PTFE easily fibrillates as will be described later in detail. Fibrillation of the fluororesin limits re-aggregation of fibrous carbon nanostructures to increase their dispersiveness. These fluororesins may be used alone or in combination.

The disclosed composite resin material comprises 70% by mass or more of fluororesin, preferably 90% by mass or more, more preferably 99% by mass or more, and particularly preferably consists solely of fluororesin and fibrous carbon nanostructures.

<Fibrous Carbon Nanostructures>

Any type of fibrous carbon nanostructures can be blended in the disclosed composite resin material, e.g., electrically conductive fibrous carbon nanostructures can be blended. Specific examples of usable fibrous carbon nanostructures include cylindrical carbon nanostructures such as carbon nanotubes (CNTs) and non-cylindrical carbon nanostructures such as carbon nanostructures having a network of 6-membered carbon rings in the form of flattened cylindrical shape. These types of fibrous carbon nanostructures can be used alone or in combination.

Among the fibrous carbon nanostructures described above, preferred are fibrous carbon nanostructures including CNTs because it is possible to efficiently impart electrical conductivity to the composite resin material even when small amounts of fibrous carbon nanostructures are blended.

The fibrous carbon nanostructures including CNTs may consist solely of CNTs or may be a mixture of CNTs and fibrous carbon nanostructures other than CNTs.

Any type of CNTs can be included in the fibrous carbon nanostructures and single-walled carbon nanotubes and/or multi-walled carbon nanotubes can be used, with single- to up to 5-walled carbon nanotubes being preferred and single-walled carbon nanotubes being more preferred. This is because the smaller the number of walls of carbon nanotubes, the greater the electrical conductivity of the composite resin material even when small amounts of fibrous carbon nanostructures are blended.

The fibrous carbon nanostructures including CNTs preferably have a number-average diameter of 1 nm or more, but preferably 60 nm or less, more preferably 30 nm or less, even more preferably 10 nm or less. When the fibrous carbon nanostructures including CNTs have a number-average diameter of 1 nm or more, it is possible to increase their dispersiveness to stably impart electrical conductivity to the composite resin material. When the fibrous carbon nanostructures including CNTs have a number-average diameter of 60 nm or less, it is possible to efficiently impart electrical conductivity to the composite resin material even when small amounts of fibrous carbon nanostructures are blended.

The fibrous carbon nanostructures including CNTs are preferably those having a ratio of a standard deviation ($\sigma$) of diameters multiplied by 3 ($3\sigma$) to average diameter (Av) ($3\sigma/Av$) of greater than 0.20 to less than 0.60, more preferably those having $3\sigma/Av$ of greater than 0.25, and even more preferably those having $3\sigma/Av$ of greater than 0.40. When fibrous carbon nanostructures including CNTs having $3\sigma/Av$ of greater than 0.20 to less than 0.60 are used, it is possible to further increase the performance of the composite resin material produced.

"Average diameter (Av) of fibrous carbon nanostructures including CNTs" and "standard deviation ($\sigma$) (where $\sigma$ is sample standard deviation) of diameters of fibrous carbon nanostructures including CNTs" can each be obtained by measuring the diameters (outer diameters) of 100 fibrous carbon nanostructures randomly selected by transmission electron microscopy. The average diameter (Av) and standard deviation ($\sigma$) of the fibrous carbon nanostructures including CNTs may be adjusted either by changing the production method and/or the production conditions or by combining different types of fibrous carbon nanostructures including CNTs, prepared by different production methods.

The fibrous carbon nanostructures including CNTs that are used typically take a normal distribution when a plot is made of diameter measured as described on the horizontal axis and the frequency on the vertical axis, and Gaussian approximation is made.

The fibrous carbon nanostructures including CNTs preferably exhibit a radial breathing mode (RBM) peak when evaluated by Raman spectroscopy. Note that no RBM appears in the Raman spectrum of fibrous carbon nanostructures composed solely of multi-walled carbon nanotubes having three or more walls.

In a Raman spectrum of the fibrous carbon nanostructures including CNTs, the ratio of G band peak intensity to D band peak intensity (G/D ratio) is preferably 0.5 to 5.0. When the G/D ratio is 0.5 to 5.0, it is possible to further increase the performance of the composite resin material produced.

The fibrous carbon nanostructures including CNTs can be produced by any CNT synthesis method known in the art, e.g., arc discharge method, laser ablation method, or chemical vapor deposition (CVD) method. Specifically, for example, CNTs can be efficiently produced in accordance with the super growth method (see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method may also be referred to as "SGCNTs."

The fibrous carbon nanostructures including CNTs produced by the super growth method may be composed solely of SGCNTs or may comprise other carbon nanostructures such as non-cylindrical carbon nanostructures in addition to SGCNTs.

The fibrous carbon nanostructures including CNTs preferably have an average length of 10 μm or more, more preferably 50 μm or more, even more preferably 80 μm or more, but preferably 600 μm or less, more preferably 550 μm or less, even more preferably 500 μm or less. When the average length is 10 μm or more, electrically conductive paths can be formed in the composite resin with small amounts of the fibrous carbon nanostructures blended, and dispersiveness can be improved as well. When the average length is 600 μm or less, it is possible to stabilize the electrical conductivity of the composite resin material.

The fibrous carbon nanostructures including CNTs preferably have a BET specific surface area of 200 m$^2$/g or more, more preferably 400 m$^2$/g or more, even more preferably 600 m$^2$/g or more, but preferably 2,000 m$^2$/g or less, more preferably 1,600 m$^2$/g or less, even more preferably 1,300 m$^2$/g or less. When the fibrous carbon nanostructures including CNTs have a BET specific surface area of 200 m$^2$/g or more, it is possible to increase the dispersiveness of the fibrous carbon nanostructures including CNTs, so that the electrical conductivity of the composite resin material can be sufficiently increased with small amounts of the fibrous carbon nanostructures blended. When the fibrous carbon nanostructures including CNTs have a BET specific surface area of 2,000 m$^2$/g or less, it is possible to stabilize the electrical conductivity of the composite resin material.

By "BET specific surface area" as used herein it is meant a nitrogen adsorption specific surface area measured by the BET method.

The fibrous carbon nanostructures including CNTs preferably exhibit a convex upward shape in a t-plot obtained from an adsorption isotherm. In particular. The "t-plot" can be obtained by converting relative pressure to average thickness t (nm) of an adsorbed layer of nitrogen gas in an adsorption isotherm of fibrous carbon nanostructures including CNTs as measured by the nitrogen gas adsorption method. Specifically, an average adsorbed nitrogen layer thickness t corresponding to a given relative pressure is calculated from a known standard adsorption isotherm which is a plot of average adsorbed nitrogen layer thickness t versus relative pressure P/P0 and the relative pressure is converted to the corresponding average adsorbed nitrogen layer thickness t to obtain a t-plot for the fibrous carbon nanostructures including CNTs (t-plot method of de Boer et al.).

The growth of an adsorbed layer of nitrogen gas for materials having pores at the surface is divided into the following processes (1) to (3). The gradient of the t-plot changes according to processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

A t-plot having a convex upward shape shows a straight line crossing the origin in a region in which the average adsorbed nitrogen layer thickness t is small. However, as t increases, the plot deviates downward from the straight line. Fibrous carbon nanostructures including CNTs that exhibit such a t-plot curve have a large internal specific surface area relative to total specific surface area of the fibrous carbon nanostructures including CNTs, indicating the presence of a large number of openings formed in the carbon nanostructures that constitute the fibrous carbon nanostructures including CNTs.

The t-plot for the fibrous carbon nanostructures including CNTs preferably has a bending point in a range of 0.2≤t (nm)≤1.5, more preferably in a range of 0.45≤t (nm)≤1.5, even more preferably in a range of 0.55≤t (nm)≤1.0. When the bending point of the t-plot for the fibrous carbon nanostructures falls within the range, it is possible to increase the dispersiveness of the fibrous carbon nanostructures including CNTs, so that the electrical conductivity of the composite resin material can be increased with small amounts of the fibrous carbon nanostructures blended. Specifically, if the bending point is present at a point less than 0.2 (nm), the fibrous carbon nanostructures may be prone to aggregation and exhibit low dispersiveness. If the bending point is present at a point greater than 1.5 (nm), the fibrous carbon nanostructures may be prone to entanglement and exhibit low dispersiveness.

The "position of the bending point" is an intersection point of an approximate straight line A for process (1) and an approximate straight line B for process (3).

The fibrous carbon nanostructures including CNTs preferably have a ratio of internal specific surface area S2 to total specific surface area S1 (S2/S1) of 0.05 to 0.30, which is obtained from the t-plot. When the fibrous carbon nanostructures including CNTs have an S2/S1 ratio that falls within this range, it is possible to increase the dispersiveness of the fibrous carbon nanostructures including CNTs, so that the electrical conductivity of the composite resin material can be increased with small amounts of the fibrous carbon nanostructures blended.

Total specific surface area S1 and internal specific surface area S2 of the fibrous carbon nanostructures including CNTs can be found from the t-plot. Specifically, first, total specific surface area S1 can be found from the gradient of an approximate straight line corresponding to process (1) and external specific surface area S3 can be found from the gradient of an approximate straight line corresponding to process (3). Internal specific surface area S2 can then be calculated by subtracting external specific surface area S3 from total specific surface area S1.

Measurement of adsorption isotherm, preparation of a t-plot, and calculation of total specific surface area S1 and internal specific surface area S2 based on t-plot analysis for fibrous carbon nanostructures including CNTs can be made using for example BELSORP®-mini (BELSORP is a registered trademark in Japan, other countries, or both), a commercially available measurement instrument available from Bel Japan Inc.

The disclosed composite resin material comprises 0.01% by mass or more of the fibrous carbon nanostructures based on the amount (100% by mass) of fluororesin, preferably 0.03% by mass or more, more preferably 0.05% by mass or more, but 0.5% by mass or less, preferably 0.3% by mass or less, more preferably 0.1% by mass or less. When the composite resin material comprises the fibrous carbon nanostructures in an amount of 0.01% by mass or more based on the amount of fluororesin, it is possible to allow the composite resin material to exert an antistatic effect. When the composite resin material comprises the fibrous carbon nanostructures in an amount of 0.5% by mass or less based on the amount of fluororesin, it is possible to reduce costs of the composite resin material. Further, when the fibrous carbon nanostructure content is not greater than this upper limit, it is possible to prevent the fibrous carbon nanostructures from being exposed on the surface of the composite resin material to avoid their separation from the composite resin material, allowing the composite resin material to have improved cleanliness and the fibrous carbon nanostructures within the composite resin material to have improved dispersiveness.

[Number of Aggregates in Composite Resin Material]

When a 50 μm thick sheet-shaped product obtained by shaping the disclosed composite resin material is observed with an optical microscope, the number of aggregates that contain the fibrous carbon nanostructures as a main component and have a diameter of 300 μm or more is 3 or less in a 30 mm×30 mm field of view. Whether or not the aggregates "contain the fibrous carbon nanostructures as a main component" can be determined for example by elemental analysis and based on the G/D ratio measured by Raman microspectroscopy. For example, when elemental analysis of the aggregate revealed that carbon content is 70% or more and the G/D ratio measured by Raman microspectroscopy falls within a predetermined range, e.g., 0.5 to 5.0, which includes the G/D ratio for the fibrous carbon nanostructures used, the analyzed aggregate can then be identified as being one that contains the fibrous carbon nanostructures as a main component. Whether or not the aggregate contains the fibrous carbon nanostructures as a main component can be more reliably determined by elemental analysis combined with the measurement of the G/D ratio obtained by Raman microspectroscopy than by elemental analysis alone. Further, for example, even when other carbon compounds (e.g., carbon black) different from the fibrous carbon nanostructures are present in the composite resin material, the combined use of the results of elemental analysis and the measurement of the G/D ratio enables determination as to whether or not the aggregate contains the fibrous carbon nanostructures as a main component.

Herein, the diameter of the aggregate was identified as the diameter of a true circle set within a microscopic field of view of a shaped product, the true circle including all the fibrous carbon nanostructures constituting the target aggregate. When a 50 μm thick shaped product obtained by shaping the composite resin material contains 3 or less such aggregates which contain fibrous carbon nanostructures as a main component per 30 mm×30 mm microscopic field of view, the composite resin material is observed as having highly dispersed fibrous carbon nanostructures. Thus, the use of such a composite resin material results in a shaped product having superior cleanliness and electrical conductivity.

(Slurry)

The disclosed slurry comprises a fluororesin, fibrous carbon nanostructures and a dispersion medium, and may optionally comprise a surfactant or other additives. Similarly to the composite resin material described above, the disclosed slurry has a fluororesin content of 70% by mass or more based on total solid content in the slurry and a fibrous carbon nanostructure content of 0.01% to 0.5% by mass based on the amount (100% by mass) of the fluororesin. One major feature of the disclosed slurry is that the fluororesin is fibrillated to have a fibrous network structure in the slurry.

Fluororesin has the characteristics of becoming fibrous and forming a network structure by application of a shear force. The present disclosure is based on the new finding that dispersing a fluororesin having a fibrous network structure in slurry results in improved dispersiveness of fibrous carbon nanostructures in the slurry. A possible but unclear mechanism by which a fluororesin having a fibrous network structure results in improved dispersiveness of fibrous carbon nanostructures in slurry is as follows: By forming a fibrous network structure by fibrillation of a fluororesin in slurry, fibrous carbon nanostructures are entrapped within the fibrous network structure whereby aggregation of the fibrous carbon nanostructures in the slurry can be prevented. It is further preferred that, by application of a shear force, a fluororesin that was originally in particulate form has a structure in which fibrous parts radially extend from the particulate part. When the fluororesin has such a structure in which fibrous parts radially extend from the particulate part in the slurry, the fibrous carbon nanostructures in the slurry are more highly dispersed in the slurry.

<Fluororesin>

The disclosed slurry comprises a fluororesin as a material blended in an amount of 70% by mass or more based on total solid content in the slurry, preferably in an amount of 90% by mass or more, particularly preferably in an amount of 99% by mass or more. The fluororesin can be the same as that described above. In particular, PTFE having the structure $(CF_2—CF_2)_n$ is preferred as the fluororesin as a material because it is believed that the fibrillation characteristics of fluororesin arise from a small polarizability of the C—F bond which leads to a weak intermolecular force. It is further preferred that the fluororesin as a material has a crystallinity of 10% or more, more preferably 30% or more, but preferably 80% or less, more preferably 60% or less. The crystallinity of the fluororesin can be measured for example by X-ray diffraction. When the crystallinity of the fluororesin falls within such a range, the fluororesin is moderately fibrillated by application of a shear force.

The fluororesin as a material to be blended in the slurry is preferably in particulate form. In particular, particulate fluororesin preferably has a volume-average particle diameter of 5 μm or more, more preferably 10 μm or more, even more preferably 20 μm or more, but preferably 250 μm or less, more preferably 150 μm or less, even more preferably 80 μm or less. By setting the volume-average particle diameter of the fluororesin to 5 μm or more, it is possible to easily fibrillate the fluororesin to improve the dispersiveness of the fibrous carbon nanostructures. By setting the volume-average particle diameter of the fluororesin to 250 μm or less, it is possible to efficiently fibrillate the fluororesin, as well as to improve the productivity of slurry by reducing clogging that may occur in the nozzle or check valve of a wet jet mill used during dispersing treatment in the slurry production process described later.

By "volume-average particle diameter" of the particulate fluororesin herein it refers to a particle diameter where the cumulative volume from the fine side amounts to 50% of the entire volume in a volume-based particle size distribution measured by dry laser diffraction.

It is further preferred that the disclosed slurry comprises a fibrous network structure having a number-average maximum strand diameter of 10 μm or less and an aspect ratio, defined as the ratio of strand length to diameter, of 3 or more in an amount of at least 30% by mass of total volume. When the slurry comprises the fibrous network structure in such an amount, the dispersiveness of the fibrous carbon nanostructures in the slurry can be further improved.

The "number-average maximum strand diameter" of the fibrous network structure is measured for example by observing 20 fibrillated fibers of fluororesin in a transmission electron microscopy (TEM) field of view, measuring the maximum strand diameters of the fibers, and averaging the measured maximum strand diameters by number.

Herein, the occupation ratio of the fibrous network structure can be determined for example by specifying structures having a ratio of strand length to diameter of 3 or more in a transmission electron microscopy (TEM) field of view, calculating the proportion of such structures in total area of fluororesin in the field of view, repeating this observation and calculation for 10 different fields of view, and averaging the calculated proportions. When the occupation ratio of the fibrous network structure calculated in the manner described above is 30% or more, then it is determined that the occupation ratio of the fibrous network structure in total volume of fluororesin is also 30% or more.

<Fibrous Carbon Nanostructures>

Fibrous carbon nanostructures usable for the disclosed slurry can be the fibrous carbon nanostructures described above.

<Dispersion Medium>

Any dispersion medium can be used for the disclosed slurry and examples thereof include polar solvents such as water, ketones such as methyl ethyl ketone (MEK), and alcohols such as ethanol and isopropyl alcohol; and nonpolar solvents such as hydrocarbon solvents, including cyclohexane and toluene. These solvents can be used alone or in combination at any ratio. It is also preferred to use polar or nonpolar solvent depending on the scheme of the slurry production process described later.

<Solid Sedimentation Degree>

The disclosed slurry preferably has a solid sedimentation degree of 0.50 or more, more preferably 0.60 or more, even more preferably 0.70 or more, but preferably 0.95 or less, more preferably 0.90 or less. In such a slurry having a solid sedimentation degree of 0.50 or more, the fluororesin is well fibrillated and therefore the fibrous carbon nanostructures are more highly dispersed. The solid sedimentation degree exceeding 0.95 means that the fluororesin is pulverized and the formation of fibrous network structure becomes insufficient, which may reduce the dispersiveness of the fibrous carbon nanostructures.

By "solid sedimentation degree" it is meant a ratio of solid layer height to overall height of a dispersion liquid obtained by dilution or concentration of the slurry to have a solid concentration of 15% by mass, as measured at a time point 1 hour after pouring the dispersion liquid into a predetermined container. "Overall height of dispersion liquid" equals to "solid layer height+liquid layer height" and the value of solid sedimentation degree can be found as "solid layer height/overall height of dispersion liquid". When the dispersion liquid is allowed to stand, it appears to separate into the solid layer described above and a liquid layer on top of the solid layer, which is present like a so-called "supernatant." Because the solid layer becomes black and the liquid layer becomes clear and colorless, the boundary between the solid layer and the liquid layer can be identified visually. The predetermined container is, for example, a 100 ml measuring cylinder having a bottom area of 6.6 cm². The dispersion medium used for dilution of the slurry may be any of the dispersion media mentioned above. The "clear and colorless" liquid layer has a light transmittance of, for example, 90% or more at a wavelength of 500 nm.

When the proportion of the fluororesin having a fibrous network structure is large, the value of solid sedimentation degree tends to increase to some extent. When fibrillation of fluororesin is insufficient, i.e., when the proportion of particulate or nearly particulate fluororesin increases, it results in not only a small value of solid sedimentation degree but also free carbon nanostructures which are not entrapped by the fibrous network structure and are floating in the liquid layer. Thus, the liquid layer tends to have decreased light transmittance.

(Process of Producing Composite Resin Material)

A composite resin material can be obtained by removing the dispersion medium from the slurry described above. An exemplary method of obtaining the composite resin material comprises the steps of: removing the dispersion medium by general drying methods such as spray drying, vacuum drying or circulation of inert gas; pulverizing the material by general pulverization methods such as a mill mixer; and subjecting resin powder obtained by pulverization to predetermined sieving.

Of note, fibrous carbon nanostructures are well dispersed in the composite resin material obtained from the slurry described above.

(Shaped Composite Resin Material Product)

The disclosed shaped composite resin material product is obtained by shaping a composite resin material obtained from the slurry described above. Specifically, the shaped composite resin material product can be obtained by shaping the composite resin material described above with a molding machine corresponding to a desired article shape, such as, a compressing machine, an extrusion machine, an injection molding machine, a rolling machine, or the like.

The shaped composite resin material product obtained in the manner described above has highly dispersed fibrous carbon nanostructures and a superior function. The disclosed shaped composite resin material product can be used for any purpose, e.g., as the material for members that require cleanliness and electrical conductivity, such as integrated circuit trays, wafer carriers, chemical solution hoses, and sealing materials.

(Slurry Production Process)

The slurry that comprises a fluororesin having a fibrous network and well-dispersed fibrous carbon nanostructures can be produced for example through a step wherein a particulate fluororesin is fibrillated to produce a fluororesin with a fibrous network structure using at least one device selected from the group consisting of a wet jet mill, an ultrasonic wave generator and a thin-film spin system disperser.

Specifically, the slurry can be produced through a step wherein the particulate fluororesin, which may be used as a material for the fluororesin having a fibrous network structure, is fibrillated in the dispersion medium using at least one device selected from the group consisting of a wet jet mill, an ultrasonic wave generator and a thin-film spin system disperser. The fibrous carbon nanostructures may be dispersed in the dispersion medium simultaneously with fibrillation of the fluororesin or may be dispersed in a separate dispersion medium in advance and then mixed with the fluororesin having a fibrous network structure. The blending amounts of the components in the slurry production process can be such that a desired slurry can be obtained; for example, the blending amounts of the components can be the same as those in the slurry.

Hereinafter, as representative examples of the slurry production process according to the present disclosure, two different production processes will be described. These production processes mainly differ in that whether or not the use of a surfactant is indispensable in the dispersing treatment of fibrous carbon nanostructures. Each process will be explained below. In either process the solid content concentration in the slurry generally ranges from 10% to 60% by mass.

(Slurry Production Process by Batch Dispersing/Mixing)

One slurry production process according to the present disclosure comprises the steps of: mixing a particulate fluororesin, fibrous carbon nanostructures and a dispersion medium to prepare a mixture (mixture preparation step); and dispersing the mixture with a wet jet mill (batch dispersing step).

<Mixture Preparation Step>

In the mixture preparation step, a mixture is prepared by mixing a fluororesin, fibrous carbon nanostructures and a dispersion medium by mixing methods known in the art. For example, a mixture can be obtained by adding a dispersion medium to a fluororesin, stirring the resulting mixture, and further adding fibrous carbon nanostructures and slightly stirring the resulting mixture. The fluororesin, fibrous carbon nanostructures and dispersion medium can be those described above.

[Fluororesin]

It is necessary in this process that the fluororesin is in particulate form and the particulate fluororesin described above used as a material can be used. Further, as described above, the particulate fluororesin preferably has a volume-average particle diameter of 5 μm or more, more preferably 10 μm or more, even more preferably 20 μm or more, but preferably 250 μm or less, more preferably 150 μm or less, even more preferably 80 μm or less. By setting the volume-average particle diameter of the fluororesin to fall within such a range, it is possible to improve the fibrillation of the fluororesin. In particular, by setting the volume-average particle diameter of the fluororesin to 250 μm or less, it is possible to reduce clogging that may occur in the nozzle and check valve of the wet jet mill.

[Dispersion Medium]

It is also preferred in this process to use, among the dispersion media mentioned above, nonpolar solvents as the dispersion medium. Among nonpolar solvents, it is particularly preferred to use hydrocarbon solvents. Although it has been believed that polar solvents are favorable in the dispersing treatment using a wet jet mill, surprisingly, clogging of the nozzle of a wet type jet mill can be reduced in dispersing treatment where nonpolar solvent is used as the dispersion medium.

The mixture may be blended with a surfactant at any desired ratio as a dispersant capable of dispersing fibrous carbon nanostructures. The surfactant can be an anionic surfactant, a cationic surfactant, or a nonionic surfactant. Specific examples of surfactants include sodium deoxycholate, sodium cholate, sodium dodecyl diphenyloxide disulfonate, cetyl trimethyl ammonium bromide, and polyoxyethylene alkyl phenyl ethers such as Triton X-100.

However, from the perspective of reducing the generation of gas (outgassing) from the composite resin material produced using a slurry obtained by dispersing the mixture with a wet jet mill, it is preferred that the mixture is substantially surfactant-free. In this process, since fibrillation of fluororesin and dispersing of fibrous carbon nanostructures are simultaneously performed in a single step by dispersing the mixture of the fluororesin and fibrous carbon nanostructures with a wet jet mill, it is possible to allow the dispersed fibrous carbon nanostructures to be entrapped by the fibrous network structure of the fluororesin to limit re-aggregation of the fibrous carbon nanostructures after dispersing treatment. For this reason, even when the slurry is substantially surfactant-free without blending any surfactant upon preparation of the mixture, it is possible to sufficiently increase the dispersiveness of the fibrous carbon nanostructures in the slurry. Further, when the slurry does not contain any surfactant, there is no need to remove the surfactant by filtration or other techniques, resulting in increased productivity of the composite resin material.

<Batch Dispersing Step>

In the batch (simultaneous) dispersing step, the mixture obtained in the manner described above is dispersed using a wet jet mill. The reason for using a wet jet mill is that since fluororesin and fibrous carbon nanostructures co-exist in the mixture, a moderately strong shear force needs to be applied to achieve sufficient dispersing of the fibrous carbon nanostructures while fibrillating the fluororesin. Specifically, the pressure to be applied when dispersing the mixture with a wet jet mill is preferably 5 MPa or more, more preferably 10 MPa or more, even more preferably 15 MPa or more, but preferably 200 MPa or less, more preferably 105 MPa or less, even more preferably 80 MPa or less, particularly preferably 50 MPa or less. The number of dispersing treatments (number of passes) is 1 or more, preferably 2 or more, more preferably 3 or more, but preferably 20 or less, more preferably 10 or less, even more preferably 5 or less. The temperature during the dispersing treatment is preferably 0° C. or higher, more preferably 5° C. or higher, even more preferably 15° C. or higher, but preferably 80° C. or lower, more preferably 50° C. or lower, even more preferably 35° C. or lower. By performing dispersing treatment with a wet jet mill under the conditions described above, it is possible to achieve efficient fibrillation of the fluororesin and improved dispersiveness of the fibrous carbon nanostructures by retaining fibrous network structure, as well as improved cleanliness by limiting breakage of the fibrous carbon nanostructures.

Examples of wet jet mills include "NanoVater" (Yoshida Kikai Co., Ltd.), "BERYU SYSTEM PRO" (Beryu Corporation), ultrahigh-pressure wet atomizer (Yoshida Works Pro), "Nanomizer" (Nanomizer, Inc.), and "StarBurst" (Sugino Machine Ltd.). From the viewpoint of limiting clogging, the minimum flow path diameter of the wet jet mill is preferably 100 μm or more, more preferably 150 μm or more, and from the view point of achieving effective dispersing under pressure, the minimum flow path diameter is preferably 1,000 μm or less, more preferably 500 μm or less, even more preferably 300 μm or less.

(Slurry Production Process by Multiple-Stage Dispersing)

The other slurry production process according to the present disclosure comprises the steps of: dispersing a fibrous carbon nanostructure mixture containing fibrous carbon nanostructures, a surfactant and a dispersion solvent with a wet jet mill, an ultrasonic wave generator or a homogenizer to prepare a fibrous carbon nanostructure dispersion liquid (fibrous carbon nanostructure dispersing step); dispersing a fluororesin mixture containing a particulate fluororesin and a dispersion medium with an ultrasonic wave generator or a thin-film spin system disperser to prepare a fluororesin dispersion liquid (fluororesin dispersing step); and mixing together the fluororesin dispersion liquid and the fibrous carbon nanostructure dispersion liquid to prepare a mixture containing the fibrous carbon nanostructures and the fluororesin, and then dispersing the mixture with a thin-film spin system disperser or a homogenizer to prepare a mixed dispersion liquid of the fibrous carbon nanostructures and fluororesin having a fibrous network structure (mixing/dispersing step).

The particulate fluororesin is converted into a fluororesin having a fibrous network structure during the fluororesin dispersing step and/or the mixing/dispersing step.

<Fibrous Carbon Nanostructure Dispersing Step>

In the fibrous carbon nanostructure dispersing step, fibrous carbon nanostructures, a surfactant and a dispersion solvent are mixed by mixing methods known in the art, and the resulting fibrous carbon nanostructure mixture is dispersed with a wet jet mill, an ultrasonic wave generator or a homogenizer. For example, fibrous carbon nanostructures are added to a dispersion medium into which a surfactant has been added and dissolved and pre-dispersing is performed with a homogenizer, after which dispersing with a wet jet mill can be performed. Pre-dispersing is not limited to processing with a homogenizer; any of the mixing methods known in the art can be employed for pre-dispersing. Because no fluororesin is added in this step, the fibrous carbon nanostructure mixture needs to be blended with a surfactant in order to prevent re-aggregation of the fibrous carbon nanostructures.

The fibrous carbon nanostructures, surfactant, dispersion medium and wet jet mill can be those described above. In particular, it is preferred in this step to use, among the dispersion media described above, polar solvents in order to increase the dispersion stability of the fibrous carbon nanostructures so that the fibrous carbon nanostructures are highly dispersed. Similarly, from the perspective of increasing the dispersiveness of the fibrous carbon nanostructures in the slurry, it is particularly preferred to employ a jet mill as a dispersing method.

The blending amount of the fibrous carbon nanostructures is determined in accordance with the blending ratio between the fibrous carbon nanostructures and the fluororesin. The blending amount of the surfactant is preferably 0.5 times or more the blending amount of the fibrous carbon nanostructures, more preferably 3 times or more, but preferably 10 times or less, more preferably 6 times or less. When the blending amount of the surfactant falls within such a range, it is possible to limit outgassing from a composite resin material formed using the resulting slurry while improving the dispersiveness of the fibrous carbon nanostructures.

The pressure to be applied upon dispersing using a wet jet mill is preferably 10 MPa or more, more preferably 50 MPa or more, even more preferably 70 MPa or more, but preferably 200 MPa or less, more preferably 150 MPa or less, even more preferably 110 MPa or less. The number of dispersing treatments is 1 or more, preferably 2 or more, more preferably 3 or more, but preferably 20 or less, more preferably 10 or less, even more preferably 7 or less. By performing dispersing treatment with a wet jet mill under the conditions described above, it is possible to limit breakage of the fibrous carbon nanostructures while sufficiently dispersing the fibrous carbon nano structures.

When the dispersing treatment is performed using an ultrasonic generator instead of a wet jet mill, the oscillation frequency is preferably 10 kHz or more, more preferably 15 kHz or more, even more preferably 20 kHz or more, but preferably 100 kHz or less, more preferably 80 kHz or less, even more preferably 50 Hz or less. The temperature during the ultrasonic dispersing treatment is preferably 0° C. or higher, but preferably 60° C. or lower, more preferably 40° C. or lower, even more preferably 10° C. or lower. The time of the ultrasonic dispersing treatment is preferably 10 minutes or longer, more preferably 15 minutes or longer, but preferably 120 minutes or shorter, more preferably 90 minutes or shorter, even more preferably 60 minutes or shorter. By setting the conditions of the dispersing treatment with an ultrasonic wave generator as described above, it is possible to limit breakage of the fibrous carbon nanostructures while sufficiently dispersing the fibrous carbon nanostructures. Examples of the ultrasonic generator include a bath type ultrasonic washer (BRANSON) and an ultrasonic homogenizer (Nissei Corporation). The ultrasonic homogenizer distinguishes it from the "homogenizer" described below in that it produces minute bubbles by ultrasonic vibration in the mixture and exerts a stirring effect repeatedly to the materials in the mixture.

When the dispersing treatment is carried out by a homogenizer, the number of revolutions is preferably 2,000 rpm or more, more preferably 3,000 rpm or more, even more preferably 4,000 rpm or more, but preferably 20,000 rpm or less, more preferably 15,000 rpm or less, even more preferably 10,000 rpm or less. The treatment time is preferably 1 minute or longer, more preferably 10 minutes or longer, even more preferably 30 minutes or longer, but preferably 200 minutes or shorter, more preferably 100 minutes or shorter, even more preferably 80 minutes or shorter. By setting the treatment conditions in the dispersing treatment with a homogenizer as described above, it is possible to limit breakage of the fibrous carbon nanostructures while sufficiently dispersing the fibrous carbon nanostructures. A specific example of the homogenizer is one manufactured by Microtech Co., Ltd.

<Fluororesin Dispersing Step>

In the fluororesin dispersion step, a fluororesin mixture containing a particulate fluororesin and a dispersion medium is dispersed with an ultrasonic generator or a thin-film spin system disperser to prepare a fluororesin dispersion liquid. For example, a fluororesin having a predetermined particle diameter is added to a dispersion medium to prepare a fluororesin mixture, which is then dispersed with an ultrasonic generator to prepare a fluororesin dispersion liquid. The particulate fluororesin and dispersion medium can be those described above. In particular, from the viewpoint of limiting re-aggregation of the fibrous carbon nanostructures, it is preferred to use, among the dispersion media described above, polar solvents. It is particularly preferred to use the same dispersion solvent as that used in the fibrous carbon nanostructure dispersing step described above. It is also preferred that the fluororesin mixture is dispersed by ultrasonic waves. The fluororesin dispersion liquid may contain a surfactant but is preferably substantially surfactant-free from the perspective of reducing outgassing from a shaped product obtained using the resultant slurry.

The oscillation frequency upon dispersing treatment with an ultrasonic generator is preferably 10 kHz or more, more preferably 15 kHz or more, even more preferably 20 kHz or more, but preferably 100 kHz or less, more preferably 80 kHz or less, even more preferably 50 Hz or less.

The treatment time of the ultrasonic dispersing treatment is preferably 10 minutes or longer, more preferably 15 minutes or longer, but preferably 120 minutes or shorter, more preferably 90 minutes or shorter, even more preferably 60 minutes or shorter.

The treatment temperature in the ultrasonic dispersing treatment is preferably 0° C. or higher, but preferably 100° C. or lower, more preferably 80° C. or lower, even more preferably 40° C. or lower.

The fluororesin can be efficiently fibrillated when the conditions used for the ultrasonic dispersing treatment are adjusted to meet these ranges.

On the other hand, when the dispersing treatment in the fluororesin dispersing step is carried out using a thin-film spin system disperser, the linear velocity is preferably 10 m/s or more, more preferably 20 m/s or more, even more preferably 30 m/s or more, but preferably 60 m/s or less, more preferably 50 m/s or less, even more preferably 45 m/s or less. The dispersing time by a thin-film spin system disperser is preferably 5 seconds or longer, more preferably 10 seconds or longer, even more preferably 20 seconds or longer, but preferably 300 seconds or shorter, more preferably 100 seconds or shorter, even more preferably 60 seconds or shorter. The fluororesin can be efficiently fibrillated when the conditions used for the dispersing treatment with a thin-film spin system disperser are adjusted to meet these ranges. "FILMIX" (PRIMIX Corporation) can be used as the thin-film spin system disperser.

<Mixing/Dispersing Step>

In the mixing/dispersing step, the fluororesin dispersion liquid and the fibrous carbon nanostructure dispersion liquid prepared as described above are mixed together by general methods known in the art to prepare a mixture containing the fibrous carbon nanostructures and fluororesin. The resultant mixture is then dispersed with a thin-film spin system disperser or a homogenizer to prepare a mixed dispersion liquid of the fibrous carbon nanostructures and fluororesin having a fibrous network structure. This mixed dispersion liquid can be used as a slurry. In particular, it is preferred to use a thin-film spin system disperser to disperse the mixture of the fibrous carbon nanostructures and fluororesin.

The conditions under which the mixture described above is dispersed with a thin-film spin system disperser can be the same as those which may be used in the fluororesin dispersing step described above. When the dispersing treatment is performed with a homogenizer, the number of revolutions is preferably 2,000 rpm or more, more preferably 3,000 rpm or more, even more preferably 4,000 rpm or more, but preferably 20,000 rpm or less, more preferably 15,000 rpm or less, even more preferably 10,000 rpm or less. Treatment time is preferably 1 minute or longer but preferably 200 minutes or shorter, more preferably 100 minutes or shorter, even more preferably 20 minutes or shorter. When the dispersing conditions are adjusted to meet these ranges, it is possible to efficiently mix the fibrous carbon nanostructures and fluororesin to improve dispersiveness.

EXAMPLES

Hereinafter, the present disclosure will be described in detail based on Examples, which however shall not be construed as being restrictive in any way. In the following, "%" and "parts" used to express quantities are by mass unless otherwise specified.

In Examples and Comparative Examples, the solid sedimentation degree, number of aggregates, volume resistivity, cleanliness, and amount of gas evolution were measured or evaluated by the methods described below.

<Solid Sedimentation Degree>

The slurries prepared in Examples and Comparative Examples were diluted with dispersion medium cyclohexane to prepare dispersion liquids having a solid content concentration of 15% by mass. Each dispersion liquid was stirred with a magnetic stirrer for 10 minutes at 800 rpm immediately before measurement. The ratio of solid layer height to overall height of the dispersion liquid, as measured at a time point 1 hour after pouring 100 ml of the dispersion liquid into a 100 ml measuring cylinder (bottom area: 6.6 $cm^2$), was recorded as a solid sedimentation degree.

<Number of Aggregates>

Using a lathe, a 50 μm thick sheet was cut out from each of the shaped composite resin material products produced in Examples and Comparatives to prepare a test piece. A 30 mm×30 mm field of view was observed for each test piece at ×100 magnification with a digital microscope (VHX-500, Keyence Corporation) and the number of aggregates having a diameter of 300 μm or more was counted.

Whether the aggregates were derived from fibrous carbon nanostructures was confirmed by elemental analysis and based on the G/D ratio measured by Raman microspectroscopy. When elemental analysis revealed that the aggregates have a carbon content of 90% or more and a G/D ratio measured by Raman microspectroscopy of between 0.5 and 5.0, the aggregates were identified as containing fibrous carbon nanostructures as a main component.

<Volume Resistivity>

Using a surface resistivity meter (Loresta® MCP-T 610 (Loresta is a registered trademark in Japan, other countries, or both), Mitsubishi Chemical Analytech Co., Ltd.), each of the shaped composite resin material products produced in Examples and Comparative Examples as a measurement sample was measured for volume conductivity in compliance with JIS K 7194. Specifically, the measurement sample was secured on an insulating board, a probe was pressed against the measurement sample at arbitrary 5 points, and a voltage of up to 90V was applied to measure volume resistivity. The average of the measured values was calculated and recorded as a volume resistivity of the composite resin material. PSP probe was selected as the four-point probe of the low resistivity meter.

<Cleanliness>

A test piece with dimensions of 5 mm×5 mm×3 mm (thickness) cut out from each of the shaped composite resin material products produced in Examples and Comparative Examples was placed in 0.1 M hydrochloric acid solution for 24 hours and then washed with water. White filter paper (ADVANTEC, 5A) was applied to the surface of the test piece, a load of 500 g was applied from the top of the filter paper, and the filter paper was moved back and forth three times with the test piece fixed. Whether or not any black transfer mark remained on the filter paper was visually judged. When the filter paper had no black transfer mark remained on the surface, the shaped composite resin material product was evaluated as having "good" cleanliness. On the other hand, when the filter paper had a black transfer mark remained on the surface, the shaped composite resin material product was evaluated as having "poor" cleanliness.

<Amount of Gas Evolution>

Purge & trap—gas chromatograph-mass spectrometry (dynamic outgassing testing) was used to determine the amount of outgassing.

200 mg of a sample with dimensions of 1 mm×1 mm×2.5 mm cut out from each of the shaped products produced in Examples and Comparative Examples was placed in a glass tube having an inner diameter of 4 mm. Next, the sample was heated at 250° C. for 60 minutes while flowing helium as inert gas through the container at a flow rate of 30 mL/min, and the gas flowing out of the container was continuously trapped onto a trap tube of a thermal desorption gas chromatography/mass spectrometer (system fitted with Agilent GC5973N and MSD 6890N), cooled to −130° C. with liquid nitrogen. The trapped gas was then analyzed on the thermal desorption gas chromatography/mass spectrometer, where the total amount of organic compounds eluted by the retention time of 25 min under the condition where HP-5 ms column (0.25 μm film thickness×0.25 mm inner diameter×30 m length) was used and the temperature was maintained at 40° C. for 3 min, raised to 280° C. at a rate of 10° C./min, and finally maintained at 280° C. for 10 min (gas flow rate: 1.0 mL/min) was reported in units of ppm by mass (organic matter in μg/resin in g) using n-hexadecane as standard. The measured values were evaluated based on the following criteria:

A: <0.01 ppm
B: 0.01 ppm to 0.05 ppm
C: >0.05 ppm

In Examples and Comparative Examples, a spectrum derived from cyclohexane or methyl ethyl ketone used as dispersion medium was not detected in the mass spectrum obtained from the thermal desorption gas chromatography/mass spectrometer.

Example 1

<Preparation of Fibrous Carbon Nanostructures>

1.9 g of aluminum tri-sec-butoxide, an aluminum compound, was dissolved in 100 mL of 2-propanol as an organic solvent. Further, 0.9 g of triisopropanolamine as a stabilizer was added and dissolved to prepare coating liquid A for forming a catalyst support layer.

In addition, 174 mg of iron acetate, an iron compound, was dissolved in 100 mL of 2-propanol as an organic solvent. Further, 190 mg of triisopropanolamine as a stabilizer was added and dissolved to prepare coating liquid B for forming a catalyst layer.

Coating liquid A was applied by spin coating onto a surface of a base Fe—Cr alloy SUS 430 substrate (JFE Steel Corporation, 40 mm×100 mm, 0.3 mm thickness, 18% Cr, arithmetic mean roughness Ra≈0.59 μm) in an environment of room temperature of 25° C. and 50% relative humidity. Specifically, 0.1 mL of coating liquid A was dropped onto the substrate and the substrate was rotated at 500 rpm for 10 seconds and then at 2,000 rpm for 20 seconds. Thereafter, coating liquid A was air-dried for 5 minutes, heated in an air environment at 300° C. for 30 minutes, and then cooled to room temperature to form an alumina thin film (catalyst support layer) on the substrate.

Subsequently, in an environment of room temperature of 25° C. and 50% relative humidity, coating liquid B was applied by spin coating onto the alumina thin film provided on the substrate. Specifically, 0.1 mL of coating liquid B was dropped on the substrate having the alumina thin film, and then the substrate was rotated at 500 rpm for 10 seconds and then at 2,000 rpm for 20 seconds. Thereafter, by air drying (drying temperature: 30° C.) for 5 minutes, an iron thin film (catalyst layer) was formed. In this way, a catalyst substrate having, in order, an alumina thin film and an iron thin film on a substrate was obtained.

<Synthesis of Aggregate of Carbon Nanostructures>

The prepared catalyst substrate was placed in a reaction furnace (kept at a furnace temperature of 750° C., and a furnace pressure of $1.02 \times 10^5$ Pa) of a batch type manufacturing apparatus, and a mixed gas of $N_2$: 100 sccm and $H_2$: 800 sccm was introduced for 10 minutes. Subsequently, in the reactor kept at a furnace temperature of 750° C. and a furnace pressure of $1.02 \times 10^5$ Pa, a mixed gas of $N_2$: 850 sccm, ethylene: 100 sccm and $H_2O$-containing $N_2$ (23% relative humidity): 50 sccm was fed for 10 minutes.

Thereafter, $N_2$: 1,000 sccm was fed into the reaction furnace, and the remaining feedstock gas and catalyst activation substance were removed. In this way an aggregate of fibrous carbon nanostructures was obtained on the catalyst substrate. The fibrous carbon nanostructure aggregate thus produced was then separated from the catalyst substrate to afford fibrous carbon nanostructures A.

Evaluation and analysis of the resulting fibrous carbon nanostructures A confirmed that BET specific surface area was 800 m$^2$/g, average diameter (Av) was 2. 7 nm, 3σ/Av was 0.42, average fiber length was not less than 100 μm, and carbon purity was 99.9%. In the measurement with a Raman spectrophotometer, a spectrum of radial breathing mode (RBM) was observed in the low wavenumber range of 100 to 300 cm$^{-1}$, which is characteristic of single-walled CNTs. The ratio of G band peak intensity to D band peak intensity (G/D ratio) in the Raman spectrum was 2.4. The t-plot of fibrous carbon nanostructures A was bent having a convex upward shape. S2/S1 was 0.24 and the bending point was at t=0.6 nm.

<Production of Slurry>

850 g of cyclohexane as a dispersion medium was added to 150 g of PTFE particles (M-12, Daikin Industries, Ltd.) having a volume-average particle diameter of 50 μm as a fluororesin, and then 0.12 g of fibrous carbon nanostructures A was added and slightly stirred to prepare a mixture. The proportion of the fibrous carbon nanostructures to the fluororesin was 0.08% by mass. No surfactant was used at this point of time.

Using a wet jet mill (NanoVater, Yoshida Kikai Co., Ltd.) fitted with straight nozzles of 200 μm and 230 μm diameter, respectively, the mixture was dispersed four times at 15° C. under the treatment condition of 20 MPa to prepare slurry A. The wet jet mill was fitted with a stirring device to prevent solid separation in the mixture. The wet jet mill was also designed to be less susceptible to clogging of a check valve for example by employing large size zirconia beads for the check valve.

Figure 1:
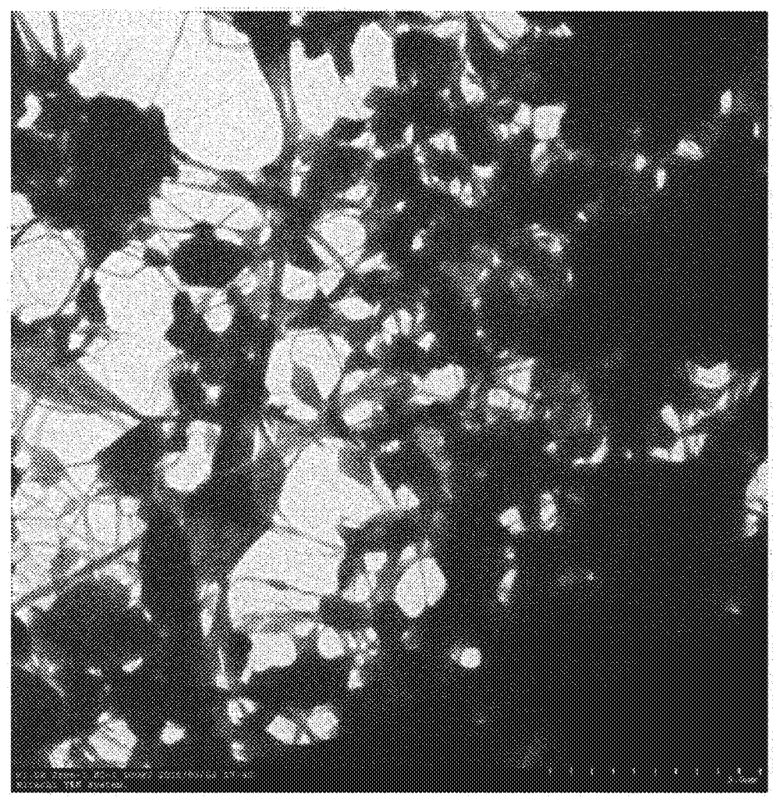
FIG. 1 is an electron microscope image of a slurry according to the present disclosure.

The fluororesin in slurry A was subjected to transmission electron microscopic (TEM) observation (accelerating voltage: 100 kV, ×1,000 magnification) to confirm the presence of a fibrous network structure (FIG. 1).

The dispersion liquid obtained by diluting slurry A with cyclohexane to have a solid content concentration of 15% by mass had a solid sedimentation degree of 0.87. The liquid layer in the measurement of solid sedimentation degree had a light transmittance of 97% at 500 nm wavelength, when measured in a quartz cell with an optical path length of 10 mm with cyclohexane used as a reference.

The number-average length of the fibrous carbon nanostructures was not less than 100 μm, when the lengths of 20 fibrous carbon nanostructures were measured by TEM observation and averaged.

<Production of Composite Resin Material and Shaped Composite Resin Material Product>

After air-drying slurry A for 24 hours, vacuum drying was carried out at 170° C. for 24 hours, and the dried material was pulverized with a mill mixer at 20,000 rpm and sieved through a 93-mesh standard sieve to afford composite resin material A.

Composite resin material A was placed in a mold with dimensions of 51 mm×51 mm×5.1 mm and compression molding was carried out at 30° C. and 15 MPa. The mold closing speed was set to 5 mm/min. The obtained shaped product was placed in an oven, heated to 370° C. at a heating rate of 50° C./h, sintered for 1.5 hours, and cooled to 25° C. at a cooling rate of 50° C./h to afford shaped composite resin material product A with dimensions of about 50 mm×50 mm×5 mm (thickness). The density of shaped composite resin material product A was 2.1 g/cm³.

Shaped composite resin material product A obtained was evaluated for the number of aggregates, volume resistivity, cleanliness, and amount of gas evolution. The results are shown in Table 1.

Example 2

Slurry B and composite resin material B were prepared as in Example 1 except that 0.045 g of fibrous carbon nanostructures A was used so that the amount of fibrous carbon nanostructures based on fluororesin was 0.03% by mass.

As in Example 1, the number-average length of the fibrous carbon nanostructures, solid sedimentation degree, fibrous network structure, number of aggregates, volume resistivity, cleanliness, and amount of gas evolution were also evaluated. The results are shown in Table 1.

Example 3

Slurry C and composite resin material C were prepared as in Example 1 except that 0.45 g of fibrous carbon nanostructures A was used so that the amount of fibrous carbon nanostructures based on fluororesin was 0.3% by mass.

As in Example 1, the number-average length of the fibrous carbon nanostructures, solid sedimentation degree, fibrous network structure, number of aggregates, volume resistivity, cleanliness, and amount of gas evolution were also evaluated. The results are shown in Table 1.

Example 4

Slurry D and composite resin material D were prepared as in Example 1 except that fibrous carbon nanostructures A were replaced by fibrous carbon nanostructures B, multi-walled carbon nanotubes (JC142, JEIO Co., Ltd.; 4 walls, average diameter=15 nm, average fiber length=not less than 100 μm, G/D ratio=0.6).

As in Example 1, the solid sedimentation degree, fibrous network structure, number of aggregates, volume resistivity, cleanliness, and amount of gas evolution were also evaluated. The results are shown in Table 1.

The fibrous carbon nanostructures in slurry D had a number-average length of 70 μm when measured as in Example 1.

Example 5

Slurry E and composite resin material E were prepared as in Example 1 except that the fluororesin was replaced by polytetrafluoroethylene (PFA) particles having a volume-average particle diameter of 42 μm. The PFA particles were prepared by micronizing commercially available PFA pellets (AP-210, Daikin Industries, Ltd.) by freeze pulverization using liquid nitrogen and sieving them through a 330-mesh (45 μm mesh size) standard sieve.

As in Example 1, the number-average length of the fibrous carbon nanostructures, solid sedimentation degree, fibrous network structure, number of aggregates, volume resistivity, cleanliness, and amount of gas evolution were also evaluated. The results are shown in Table 1.

Example 6

Slurry F and composite resin material F were prepared as in Example 1 except that the slurry was produced in the manner described below.

As in Example 1, the number-average length of fibrous carbon nanostructures, solid sedimentation degree, fibrous network structure, number of aggregates, volume resistivity, cleanliness, and amount of gas evolution were also evaluated. The results are shown in Table 1. While a spectrum derived from methyl ethyl ketone used as dispersion medium was not detected in the mass spectrum obtained from the thermal desorption gas chromatography/mass spectrometer in the evaluation of the amount of gas evolution, mass spectrum peaks derived from the surfactant and decomposition products of surfactant were confirmed.

<Production of Slurry>

[Production of Fibrous Carbon Nanostructure Dispersion Liquid]

5 g (equals to 5 times the amount of fibrous carbon nanostructures) of a surfactant (AJISPER PB821, Ajinomoto Fine-Techno Co., Inc.) was added and dissolved into 994 g of methyl ethyl ketone (MEK) as a dispersion medium, after which 1.0 g of fibrous carbon nanostructures A was added and pre-dispersing was carried out using a homogenizer. Dispersing treatment was then performed 5 times at 100 MPa using a jet mill (NanoVater, Yoshida Kikai Co., Ltd) fitted with straight nozzles of 180 μm and 200 μm diameter, respectively, to prepare 1,000 g of fibrous carbon nanostructure dispersion liquid A.

[Production of Fluororesin Dispersion Liquid]

100 g of PTFE particles (M-12, Daikin Industries, Ltd.) having a volume-average particle diameter of 50 μm was added into 100 g of dispersion medium MEK to prepare a mixture. The mixture was subjected to ultrasonic treatment at 0° C. for 30 minutes in an ultrasonic washer (BRANSON 5510) having an oscillation frequency of 42 kHz to prepare fluororesin dispersion liquid A.

[Production of Mixed Dispersion Liquid]

16 g of fibrous carbon nanostructure dispersion liquid A (containing 0.016 g of fibrous carbon nanostructures and 0.08 g of surfactant) was added to 40 g of fluororesin dispersion liquid A (containing 20 g of fluororesin) and stirred to prepare a mixture. Dispersing treatment was then carried out at 30 m/s for 1 minute using a thin-film spin system disperser (FILMIX 56-50, PRIMIX Corporation) to prepare slurry F.

Example 7

Slurry G and composite resin material G were prepared as in Example 1 except that the slurry was produced in the manner described below.

As in Example 1, the solid sedimentation degree, fibrous network structure, number of aggregates, volume resistivity, cleanliness, and amount of gas evolution were also evaluated. The results are shown in Table 1. While a spectrum derived from methyl ethyl ketone used as dispersion medium was not detected in the mass spectrum obtained from the thermal desorption gas chromatography/mass spectrometer in the evaluation of the amount of gas evolution, mass spectrum peaks derived from surfactant and decomposition products of surfactant were confirmed.

The fibrous carbon nanostructures in slurry G had a number-average length of 40 μm when measured as in Example 1.

<Production of Slurry>

[Production of Fibrous Carbon Nanostructure Dispersion Liquid]

0.1 g (equals to 5 times the amount of fibrous carbon nanostructures) of a surfactant (AJISPER PB821, Ajinomoto Fine-Techno Co., Inc.) as a dispersant was added and dissolved into 19.88 g of methyl ethyl ketone (MEK) as a dispersion medium, after which 0.02 g of fibrous carbon nanostructures A was added to prepare a mixture. The mixture was then subjected to ultrasonic treatment at 0° C. for 30 minutes in an ultrasonic washer (BRANSON 5510) having an oscillation frequency of 42 kHz to prepare fibrous carbon nanostructure dispersion liquid B. At this point of time, the fibrous carbon nanostructures had a number-average fiber length of 40 μm when the lengths of 20 fibrous carbon nanostructures were measured by TEM observation and averaged. It was also observed that breakage of the fibrous carbon nanostructures occurred due to ultrasonic treatment.

[Production of Mixed Dispersion Liquid]

16 g of fibrous carbon nanostructure dispersion liquid B (containing 0.016 g of fibrous carbon nanostructures) was added to 40 g of fluororesin dispersion liquid A (containing 20 g of fluororesin) prepared as in Example 6, and stirred to prepare a mixture. Dispersing treatment was then carried out at 30 m/s for 1 minute using a thin-film spin system disperser (FILMIX 56-50, PRIMIX Corporation) to prepare slurry G.

Example 8

Slurry H and composite resin material H were prepared as in Example 1 except that dispersing treatment using a jet mill was carried out four times at 40 MPa.

As in Example 1, the number-average length of fibrous carbon nanostructures, solid sedimentation degree, fibrous network structure, number of aggregates, volume resistivity, cleanliness, and amount of gas evolution were also evaluated. The results are shown in Table 1.

Comparative Example 1

<Production of Slurry>

As a fluororesin 150 g of PTFE particles (M-18F, Daikin Industries, Ltd.) having a volume-average particle diameter of 25 μm was mixed with methyl ethyl ketone at a mass ratio of 1:5 to prepare a solution. To this solution was added 75 g of fibrous carbon nanostructure dispersion liquid A (containing 0.075 g of fibrous carbon nanostructures) prepared as in Example 6, and the mixture was mixed in a beaker and stirred at 800 rpm for 60 minutes at room temperature with a stirrer to prepare slurry I. No fibrous network structure was confirmed in the fluororesin in slurry I. The number-average length of the fibrous carbon nanostructures in slurry I measured as in Example 1 was not less than 100 μm. The solid sedimentation degree of slurry I measured as in Example 1 was 0.3.

<Production of Composite Resin Material and Shaped Composite Resin Material Product>

Slurry I was allowed to stand and the separated supernatant was removed with a dropper, after which the remainder was dried overnight (12 hours) in a vacuum drier. The dried material was then pulverized with a mill mixer at 20,000 rpm and sieved through a 93-mesh standard sieve to afford composite resin material I.

Composite resin material I was placed in a mold with dimensions of 51 mm×51 mm×5.1 mm and compression molding was carried out at 30° C. and 15 MPa. The mold closing speed was set to 5 mm/min. The obtained shaped product was placed in an oven, heated to 370° C. at a heating rate of 50° C./h, sintered for 1.5 hours, and cooled to 25° C. at a cooling rate of 50° C./h to afford shaped product I with dimensions of about 50 mm×50 mm×5 mm (thickness).

Shaped composite resin material product I obtained was evaluated for the number of aggregates, volume resistivity, cleanliness, and amount of gas evolution. The results are shown in Table 1. As in Examples 6 and 7, while a spectrum derived from methyl ethyl ketone used as dispersion medium was not detected, mass spectrum peaks derived from the surfactant and decomposition products of surfactant were confirmed.

Comparative Example 2

<Production of Slurry>

A container fitted with a stirrer was filled with a solution obtained by adding 900 g of methyl ethyl ketone to 100 g of fibrous carbon nanostructure dispersion liquid A (containing 0.1 g of fibrous carbon nanostructures) prepared in Example 6. To the container was slowly added 200 g of PTFE particles (M-18F, Daikin Industries, Ltd.) having a volume-average particle diameter of 25 μm as a fluororesin under stirring over 5 minutes to prepare a mixed slurry of carbon nanotube dispersion liquid and fluororesin.

Next, using a slurry pump, 120 g of the prepared mixed slurry was charged into a pressure-resistant container fitted with a stirrer, and a total of about 100 g of liquefied carbonic acid was added at a rate of 10 g/min for 11 minutes. Charging of liquefied carbonic acid was carried out while discharging gasified carbonic acid by adjusting the discharge pressure valve attached to the pressure-resistant container.

After charging of liquefied carbonic acid was completed, electricity was supplied to a heater box surrounding the pressure-resistant container with the stirrer attached to the pressure-resistant container being operated, and the temperature inside the pressure-resistant container was adjusted to 65° C. so that the carbonic acid inside the container was in a supercritical state. At this point of time, the pressure-resistant container had an internal pressure of about 25 MPa.

Next, once the temperature inside the pressure-resistant container reached 65° C., charging of liquefied carbonic acid was again started with the stirrer operated, and charging was continued for 2 hours at a charging rate of 1 g/min. Charging of liquefied carbonic acid was carried out while discharging gas-liquid mixed gas in which gasified carbonic acid is mixed with dispersion solution (solvent+dispersant) dissolved into carbonic acid by adjusting the discharge pressure valve attached to the pressure-resistant container.

After 2 hours, the supply of liquefied carbonic acid was stopped and the gas-liquid mixed gas in the pressure-resistant container was discharged from the discharge pressure valve until the internal pressure decreases to atmospheric pressure. In this way slurry J was prepared. No fibrous network structure was confirmed in the fluororesin in slurry J. The number-average length of the fibrous carbon nanostructures in slurry J measured as in Example 1 was not less than 100 μm. The solid sedimentation degree of slurry J measured as in Example 1 was 0.35.

<Production of Composite Resin Material and Shaped Composite Resin>

Slurry J obtained was filtered through a filtration filter (membrane filter, 47 mm diameter, 0.1 μm pore size, MILLIPORE). The recovered solids were dried in a vacuum dryer overnight (12 hours), pulverized with a mill mixer at 20,000 rpm, and sieved through a 93-mesh standard sieve to afford composite resin material J.

Composite resin material J was placed in a mold with dimensions of 51 mm×51 mm×5.1 mm and compression molding was carried out at 30° C. and 15 MPa. The mold closing speed was set to 5 mm/min. The obtained shaped product was placed in an oven, heated to 370° C. at a heating rate of 50° C./h, sintered for 1.5 hours, and cooled to 25° C. at a cooling rate of 50° C./h to afford shaped product J with dimensions of about 50 mm×50 mm×5 mm (thickness).

Shaped composite resin material product J obtained was evaluated for the number of aggregates, volume resistivity, cleanliness, and amount of gas evolution. The results are shown in Table 1. As in Comparative Example 1, while a spectrum derived from methyl ethyl ketone used as dispersion medium was not detected, mass spectrum peaks derived from the surfactant and decomposition products of surfactant were confirmed.

In Table 1 shown below,

"PTFE" stands for polytetrafluoroethylene,

"PFA" stands for tetrafluoroethylene perfluoroalkyl vinyl ether copolymer,

"SWCNTs" stands for single-walled carbon nanotubes, and

"MWCNTs" stands for multi-walled carbon nanotubes.

Table 1

| | | | Ex. 1 | Ex. 2 | Ex. 3 | Ex. 4 | Ex. 5 |
|---|---|---|---|---|---|---|---|
| Fluororesin | | Types | PTFE | PTFE | PTFE | PTFE | PFA |
| | | Volume-average particle diameter [μm] | 50 | 50 | 50 | 50 | 42 |
| | | Content [% by mass] | 99.92 | 99.97 | 99.70 | 99.92 | 99.92 |
| Fibrous carbon nanostructures | | Types | SWCNTs | SWCNTs | SWCNTs | MWCNTs | SWCNTs |
| | | Average diameter [nm] | 2.7 | 2.7 | 2.7 | 15 | 2.7 |
| | Average fiber length [μm] | Before dispersing | ≥100 μm | ≥100 μm | ≥100 μm | ≥100 μm | ≥100 μm |
| | | After dispersing | ≥100 μm | ≥100 μm | ≥100 μm | 70 μm | ≥100 μm |
| | | Specific surface area [m²/g] | 800 | 800 | 800 | 230 | 800 |
| | | Content based on fluororesin amount [% by mass]*¹ | 0.08 | 0.03 | 0.3 | 0.08 | 0.08 |
| | t-plot | Shape | convexed upward | convexed upward | convexed upward | — | convexed upward |
| | | Bending point [nm] | 0.6 | 0.6 | 0.6 | — | 0.6 |
| | | S2/S1 | 0.24 | 0.24 | 0.24 | — | 0.24 |
| Slurry production conditions | | Dispersing method | Batch dispersing/mixing | Batch dispersing/mixing | Batch dispersing/mixing | Batch dispersing/mixing | Batch dispersing/mixing |
| | Fibrous carbon nanostructure dispersing step | Type of fibrous carbon nanostructure dispersion liquid | — | — | — | — | — |
| | | Dispersing means | — | — | — | — | — |
| | | Surfactant amount [% by mass] | — | — | — | — | — |
| | | Condition Pressure [Mpa] (Oscillation frequency [kHz]) | — | — | — | — | — |
| | | No. of Treatments (Treatment time (min)) | | | | | |
| | Fluororesin dispersing step | Fluororesin dispersion liquid | — | — | — | — | — |
| | | Dispersing means | — | — | — | — | — |
| | | Presence of surfactant | — | — | — | — | — |
| | | Condition Oscillation frequency [kHz] | — | — | — | — | — |
| | | Treatment time [min] | — | — | — | — | — |
| | Mixing/dispersing step | Slurry type | — | — | — | — | — |
| | | Dispersing means | — | — | — | — | — |
| | | Blended surfactant amount [times fibrous carbon nanostructures] | — | — | — | — | — |
| | | Condition Linear velocity [m/s] (No. of revolutions [rpm]) | — | — | — | — | — |
| | | Treatment time [min] | — | — | — | — | — |
| | Batch dispersing step | Slurry type | A | B | C | D | E |
| | | Dispersing means | Jet mill | Jet mill | Jet mill | Jet mill | Jet mill |
| | | Condition Pressure [Mpa] | 20 | 20 | 20 | 20 | 20 |
| | | No. of treatments | 4 | 4 | 4 | 4 | 4 |
| Properties | | Solid sedimentation degree | 0.87 | 0.87 | 0.87 | 0.87 | 0.53 |
| | | Presence of fibrous network structure | YES | YES | YES | YES | YES |
| Evaluations | | No. of aggregates | 0 | 0 | 3 | 2 | 2 |
| | | Volume resistivity (Ω · cm) | $1.4 \times 10^6$ | $5.6 \times 10^9$ | $4.2 \times 10^2$ | $7.2 \times 10^8$ | $5.6 \times 10^7$ |
| | | Cleanliness | Good | Good | Good | Good | Good |
| | | Amount of gas evolution | A | A | A | A | A |

| | | | Ex. 6 | Ex. 7 | Ex. 8 | Comp. Ex. 1 | Comp. Ex. 2 |
|---|---|---|---|---|---|---|---|
| Fluororesin | | Types | PTFE | PTFE | PTFE | PTFE | PTFE |
| | | Volume-average particle diameter [μm] | 50 | 50 | 50 | 25 | 25 |
| | | Content [% by mass] | 99.52 | 99.52 | 99.92 | 99.70 | 99.70 |
| Fibrous carbon nanostructures | | Types | SWCNTs | SWCNTs | SWCNTs | SWCNTs | SWCNTs |
| | | Average diameter [nm] | 2.7 | 2.7 | 2.7 | 2.7 | 2.7 |
| | Average fiber length [μm] | Before dispersing | ≥100 μm | ≥100 μm | ≥100 μm | ≥100 μm | ≥100 μm |
| | | After dispersing | ≥100 μm | 40 μm | ≥100 μm | ≥100 μm | ≥100 μm |
| | | Specific surface area [m²/g] | 800 | 800 | 800 | 800 | 800 |

-continued

| | | | | | | | |
|---|---|---|---|---|---|---|---|
| | | Content based on fluororesin amount [% by mass]*1 | 0.08 | 0.08 | 0.08 | 0.05 | 800 |
| | t-plot | Shape | convexed upward | convexed upward | convexed upward | convexed upward | convexed upward |
| | | Bending point [nm] | 0.6 | 0.6 | 0.6 | 0.6 | 0.6 |
| | | S2/S1 | 0.24 | 0.24 | 0.24 | 0.24 | 0.24 |
| Slurry production conditions | | Dispersing method | Multiple stage | Multiple stage | Batch dispersing/mixing | Multiple stage | Multiple stage |
| | Fibrous carbon nanostructure dispersing step | Type of fibrous carbon nanostructure dispersion liquid | A | B | — | A | A |
| | | Dispersing means | Jet mill | Ultrasonic generator | — | Jet mill | Jet mill |
| | | Surfactant amount [% by mass] | 0.5 | 0.5 | — | 0.5 | 0.5 |
| | | Condition Pressure [Mpa] (Oscillation frequency [kHz]) | 100 | (42) | — | 100 | 100 |
| | | No. of Treatments (Treatment time (min)) | 5 | (30) | — | 5 | 5 |
| | Fluororesin dispersing step | Fluororesin dispersion liquid | A | A | — | — | — |
| | | Dispersing means | Ultrasonic generator | Ultrasonic generator | — | — | — |
| | | Presence of surfactant | — | — | — | — | — |
| | | Condition Oscillation frequency [kHz] | 42 | 42 | — | — | — |
| | | Treatment time [min] | 30 | 30 | — | — | — |
| | Mixing/dispersing step | Slurry type | F | G | — | I | J |
| | | Dispersing means | Thin-film spin system disperser | Thin-film spin system disperser | — | Stirrer | Supercritical method |
| | | Blended surfactant amount [times fibrous carbon nanostructures] | 5 | 5 | — | 5 | 5 |
| | | Condition Linear velocity [m/s] (No. of revolutions [rpm]) | 30 | 30 | — | (800 [rpm]) | — |
| | | Treatment time [min] | 1 | 1 | — | 60 | — |
| | Batch dispersing step | Slurry type | — | — | H | — | — |
| | | Dispersing means | — | — | Jet mill | — | — |
| | | Condition Pressure [Mpa] | — | — | 40 | — | — |
| | | No. of treatments | — | — | 4 | — | — |
| Properties | | Solid sedimentation degree | 0.65 | 0.65 | 0.92 | 0.3 | 0.35 |
| | | Presence of fibrous network structure | YES | YES | YES | No | No |
| Evaluations | | No. of aggregates | 1 | 3 | 0 | 8 | 12 |
| | | Volume resistivity (Ω · cm) | $7.8 \times 10^5$ | $2.8 \times 10^9$ | $8.4 \times 10^6$ | $9.8 \times 10^4$ | $2.3 \times 10^6$ |
| | | Cleanliness | Good | Good | Good | Poor | Poor |
| | | Amount of gas evolution | C | C | A | B | B |

*1Fibrous carbon nanostructure content [% by mass] based on the amount (100% by mass) of fluororesin content As can be seen from Table 1, the composite resin materials prepared in Examples 1-8, each of which comprises a fluororesin and fibrous carbon nanostructures and has a fluororesin content of 70% by mass or more and a fibrous carbon nanostructure content of 0.01% to 0.5% by mass based on the amount of fluororesin, are superior in electrical conductivity and cleanliness.

INDUSTRIAL APPLICABILITY

According to the present disclosure, it is possible to provide a composite resin material, a slurry and a shaped composite resin material product, which have highly dispersed fibrous carbon nanostructures.

The invention claimed is:

1. A slurry comprising a fluororesin, fibrous carbon nanostructures, and a dispersion solvent,
   wherein the slurry has a fluororesin content of 70% by mass or more based on total solid content in the slurry and a fibrous carbon nanostructure content of 0.01% to 0.5% by mass based on the amount of the fluororesin, and
   wherein the fluororesin has a fibrous network structure.

2. The slurry according to claim 1, wherein the fluororesin having a fibrous network structure has a structure in which fibrous parts extend radially from a particulate part.

3. The slurry according to claim 1, wherein the slurry has a solid sedimentation degree of 0.50 or more, wherein the solid sedimentation degree is a ratio of solid layer height to overall height of a dispersion liquid of the slurry adjusted to have a solid concentration of 15% by mass, as measured at a time point 1 hour after pouring the dispersion liquid into a predetermined container.

4. A process for producing the slurry according to claim 1, comprising:
   fibrillating a particulate fluororesin using at least one device selected from the group consisting of a wet jet mill, an ultrasonic wave generator and a thin-film spin system disperser to provide a fluororesin having a fibrous network structure.

5. The process according to claim 4, comprising:
   mixing the particulate fluororesin, fibrous carbon nanostructures and a dispersion medium to prepare a mixture, and
   fibrillating the particulate fluororesin while dispersing the mixture using a wet jet mill.

6. The process according to claim 5, wherein the dispersion medium is a nonpolar solvent.

7. The process according to claim 5, wherein a surfactant is not added in the mixture preparation step.

8. The process according to claim 4, wherein the process comprises:
   dispersing a fibrous carbon nanostructure mixture containing fibrous carbon nanostructures, a surfactant and a dispersion medium with a wet jet mill, an ultrasonic wave generator or a homogenizer to prepare a fibrous carbon nanostructure dispersion liquid;

dispersing a fluororesin mixture containing the particulate fluororesin and a dispersion medium with an ultrasonic wave generator or a thin-film spin system disperser to prepare a fluororesin dispersion liquid; and mixing together the fluororesin dispersion liquid and the fibrous carbon nanostructure dispersion liquid to prepare a mixture containing the fibrous carbon nanostructures and the fluororesin, and then dispersing the mixture with a thin-film spin system disperser or a homogenizer to prepare a mixed dispersion liquid of the fibrous carbon nanostructures and fluororesin having a fibrous network structure.

9. A process for producing a composite resin material by using a slurry comprising a fluororesin, fibrous carbon nanostructures, and a dispersion solvent, the process comprising removing the dispersion solvent from the slurry, wherein the slurry has a fluororesin content of 70% by mass or more based on total solid content in the slurry and a fibrous carbon nanostructure content of 0.01% to 0.5% by mass based on the amount of the fluororesin, and wherein the fluororesin has a fibrous network structure.

10. The process according to claim 9, wherein the fluororesin having a fibrous network structure has a structure in which fibrous parts extend radially from a particulate part.

11. The process according to claim 9, wherein the slurry has a solid sedimentation degree of 0.50 or more, wherein the solid sedimentation degree is a ratio of solid layer height to overall height of a dispersion liquid of the slurry adjusted to have a solid concentration of 15% by mass, as measured at a time point 1 hour after pouring the dispersion liquid into a predetermined container.

12. The process according to claim 9, wherein the fibrous carbon nanostructures include carbon nanotubes and the fibrous carbon nanostructures that include carbon nanotubes have a number-average diameter of 1 nm to 60 nm and a number-average length of 10 μm or more.

13. A process for producing a shaped composite resin material product, the process comprising shaping the composite resin material obtained from the process according to claim 9.

14. A composite resin material comprising a fluororesin and fibrous carbon nanostructures, wherein the composite resin material has a fluororesin content of 70% by mass or more and a fibrous carbon nanostructure content of 0.01% to 0.5% by mass based on the amount of the fluororesin, and wherein the fluororesin has a fibrous network structure.

15. A shaped composite resin material product comprising the composite resin material according to claim 14.

* * * * *